(12) United States Patent
Sherwin et al.

(10) Patent No.: US 7,624,039 B2
(45) Date of Patent: Nov. 24, 2009

(54) AFFINITY SHOPPING PORTAL

(75) Inventors: Francis M. Sherwin, Cleveland Heights, OH (US); Michael A. Keresman, III, Kirtland Hills, OH (US); Ravishankar S. Bhagavatula, Yorba Linda, CA (US); Chandra S. Balasubramanian, Mentor-on-the-Lake, OH (US)

(73) Assignee: Cardinalcommerce Corporation, Mentor, OH (US)

( * ) Notice: Subject to any disclaimer, the term of this patent is extended or adjusted under 35 U.S.C. 154(b) by 1756 days.

(21) Appl. No.: 09/917,143

(22) Filed: Jul. 27, 2001

(65) Prior Publication Data

US 2002/0052784 A1 May 2, 2002

Related U.S. Application Data

(60) Provisional application No. 60/221,397, filed on Jul. 28, 2000.

(51) Int. Cl.
*G06Q 30/00* (2006.01)
(52) U.S. Cl. ........................................................ 705/14
(58) Field of Classification Search .................... 705/14
See application file for complete search history.

(56) References Cited

U.S. PATENT DOCUMENTS

| 5,466,919 | A | * | 11/1995 | Hovakimian | 705/17 |
| 6,029,141 | A | * | 2/2000 | Bezos et al. | 705/26 |
| 2001/0025263 | A1 | * | 9/2001 | Dorff et al. | 705/35 |
| 2001/0053997 | A1 | * | 12/2001 | Bain | 705/14 |
| 2002/0077930 | A1 | * | 6/2002 | Trubey et al. | 705/26 |
| 2004/0225558 | A1 | * | 11/2004 | Lipin | 705/14 |

OTHER PUBLICATIONS

Slatalla, Michelle, "User's guide; Building Web Pages Is Child's Play", The New York Times, May 7, 1998, p. G11.*

* cited by examiner

*Primary Examiner*—Michael Bekerman
(74) *Attorney, Agent, or Firm*—Fay Sharpe LLP

(57) ABSTRACT

A method of administering a commercial transaction carried out over a communications network (20) used for shopping includes receiving a shopper (50) at a first web-site maintained on the communications network (20). The shopper (50) has an affinity group (40) associated therewith. The method further includes forwarding the shopper (50) to a second web-site maintained on the communications network (20), and obtaining a generated click-through fee related thereto. A portion of the obtained click-through fee is distributed to the affinity group (40) associated with the shopper (50), and it is communicated to the shopper (50) how much was distributed.

12 Claims, 5 Drawing Sheets

AFFINITY SHOPPING PORTAL

This application claims the benefit of U.S. Provisional Patent Application No. 60/221,397 filed Jul. 28, 2000.

BACKGROUND OF THE INVENTION

The present invention relates to the art of Internet commerce. It finds particular application in conjunction with a shopping portal and business model for generating contributions to charitable, non-profit, and other affinity groups or organizations, and will be described with particular reference thereto. However, it is to be appreciated that the present invention is also amenable to other like applications.

Internet commerce, or e-commerce as it is otherwise known, relates to the buying and selling of goods and services over the Internet. The convenience of shopping over the Internet has sparked considerable interest in e-commerce on behalf of both consumers and merchants. For merchants desiring to increase sales, it would be advantageous to have high levels of Internet traffic from interested consumers. Toward this end, merchants with a presence on the Internet will often pay fees in an effort to attract consumers to their web-site. Often, these fees are advertising fees and/or referral commissions, otherwise known as "click-through fees."

Typically, advertising fees refer to those fees paid by the merchant to another web-site owner for providing space on the latter's web-site to display the merchant's "banner ads." The banner ads are used to advertise the merchant's website and/or goods. In addition to advertising the merchant's web-site and/or goods, the banner ads will often provide a hyper-link directing the consumer to the merchant's web-site. Another type of fee often paid by merchants is the click-through fee. The click-through fee can be likened to a commission that is paid to a web-site owner when a consumer referred to the merchant's web-site makes a purchase. The consumer is considered referred to the merchant's web-site when they hyper-link or are otherwise directed there from or through a web-site owner's web-page, typically, by an object or link on the web-site owner's web-page. For example, a "click-through fee" referral system is described in U.S. Pat. No. 6,029,141 to Bezos, et al., incorporated herein by reference.

Often, consumers are members or supporters of non-profit organizations, fraternal organizations, charities, unions, school alumni, associations, or other like affinity groups. Many of these affinity groups rely on and/or appreciate donations, gifts, or other financial support to carry out their mission. Moreover, depending on the affinity group, donations made thereto may be tax deductible with respect to the donor. Accordingly, it would be advantageous if consumers could financially support their desired affinity group or groups while maintaining a record thereof so that, e.g., any available tax deductions could be obtained, or so that the contributions could be recognized in some manner, or so that the donor may simply reflect and take pleasure in the charitable contributions he has generated, etc. Moreover, it is desirable that the consumers not be overburdened in this pursuit so that participation by the consumers is maximized and in turn financial support for the affinity groups is maximized. Therefore, the foregoing goal is best achieved when the consumers' participation is made relatively easy such as when the consumers' participation amounts to doing that which they would already do anyway, e.g., by shopping for needed or desired goods or services on the Internet.

Accordingly, the present invention contemplates a new and improved affinity shopping portal which achieves the above-referenced goals and others.

SUMMARY OF THE INVENTION

An object of the present invention is to provide, maintain and/or administer an Internet shopping portal for the mutual benefit of merchants, affinity groups and consumers.

In accordance with one aspect of the present invention, a method of administering a commercial transaction carried out over a communications network used for shopping is provided. The method includes receiving a shopper at a first website maintained on the communications network. The shopper has an affinity group associated therewith. The method further includes forwarding the shopper to a second web-site maintained on the communications network, and obtaining a generated click-through fee related thereto. A portion of the obtained click-through fee is distributed to the affinity group associated with the shopper, and it is communicated to the shopper how much was distributed.

In accordance with another aspect of the present invention, a method of conducting commercial transactions on a communications network to raise funds for affinity groups includes receiving shoppers at a first web-site on the communications network. Each shopper is associated with one of a plurality of affinity groups. The method further includes forwarding each shopper to a selected one of a plurality of second web-sites maintained on the communications network, and obtaining generated click-through fees related thereto. On behalf of each shopper, a portion of each obtained click-through fee is distributed to the respective affinity group associated with that shopper; and it is communicating to each shopper how much was distributed to their associated affinity group on their behalf.

In accordance with still another aspect of the present invention, a shopping portal is provided that includes: mean for maintaining a presence on a communications network such that shoppers employing the communications network can be received; means for identifying received shoppers; means for forwarding shoppers to selected shopping sites maintained on the communications network; means for monitoring forwarded shoppers' activities at the shopping sites to which they are forwarded; means for obtaining click-through fees based upon the monitored activities of shoppers at the shopping sites to which they were forwarded; means for distributing a portion of each obtained click-through fee to an affinity group associated with the shopper responsible for generating the click-through fee; and, means for reporting to shoppers an amount distributed to their associated affinity groups by the distributing means.

One advantage of the present invention is on-line merchants receive Internet traffic from interested consumers.

Another advantage of the present invention is affinity groups receive financial support.

Yet another advantage of the present invention is that consumers maintain records of donations to their chosen affinity groups such that any available tax deductions can be readily obtained.

Still further advantages and benefits of the present invention will become apparent to those of ordinary skill in the art upon reading and understanding the following detailed description of the preferred embodiments.

BRIEF DESCRIPTION OF THE DRAWING(S)

The invention may take form in various components and arrangements of components, and in various steps and arrangements of steps. The drawings are only for purposes of illustrating preferred embodiments and are not to be construed as limiting the invention.

FIG. 1 is a diagrammatic illustration of a network employed in connection with aspects of the present invention.

DETAILED DESCRIPTION OF THE PREFERRED EMBODIMENT(S)

Figure 1:
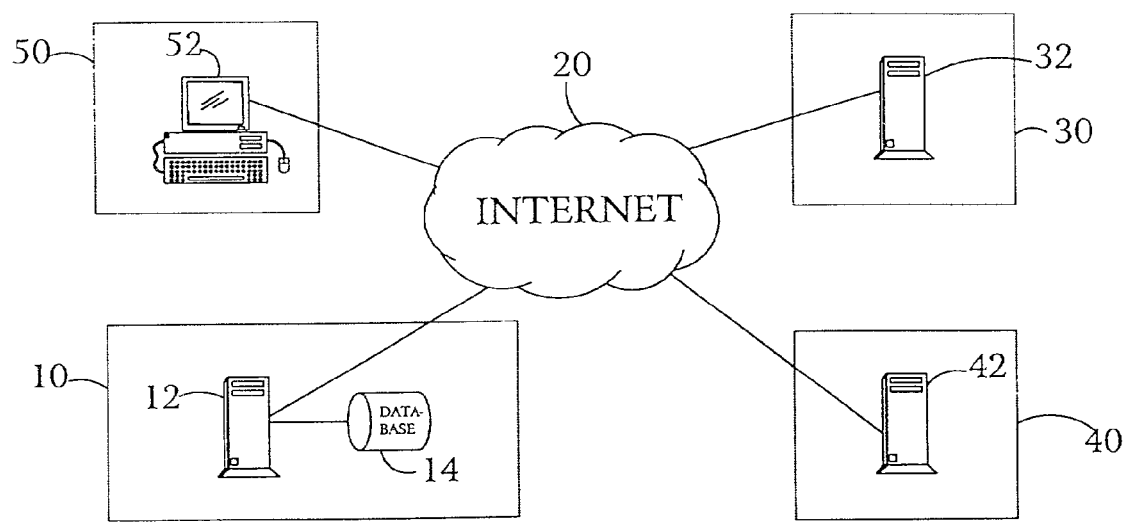

With reference to FIG. 1, in a preferred embodiment, a coordinator 10, acting as a shopping portal, maintains a presence on the Internet 20 or other like on-line network via a server 12. A merchant 30 also maintains a presence on the Internet 20 via a server 32. Likewise, an affinity group 40 maintains a presence on the Internet 20 via a server 42. A consumer 50 gains access to the affinity group 30 and/or the coordinator 10 over the Internet 20 using a computer 52 with an appropriate web browser or other like software running thereon. The consumer 50 is optionally an individual, a business, a manufacturer, or any other customer or entity which purchases goods and/or services.

Of course, the shopping portal is preferably administered to multiple similarly situated merchants 30, affinity groups 40, and consumers 50. However, in the interest of simplicity herein, only one of each are shown in FIG. 1. Moreover, it is to be appreciated that security is optionally maintained by encrypting, with known encryption techniques, communications relayed or otherwise transmitted over the Internet 20. Alternately or in conjunction with the foregoing, other known security measures may be employed.

In a preferred embodiment, the coordinator 10 also maintains a database 14 wherein records or information is stored regarding those merchants 30, affinity groups 40, and consumers 50 to which the shopping portal is administered. For each entity (i.e., merchant, affinity group, or consumer), the records preferably include one or more of the following: name; address; identifying information, such as a user name or the like; security information, such as a password or the like; account information; etc. Alternately, separate interfaced databases are maintained for each entity type.

Figure 2:
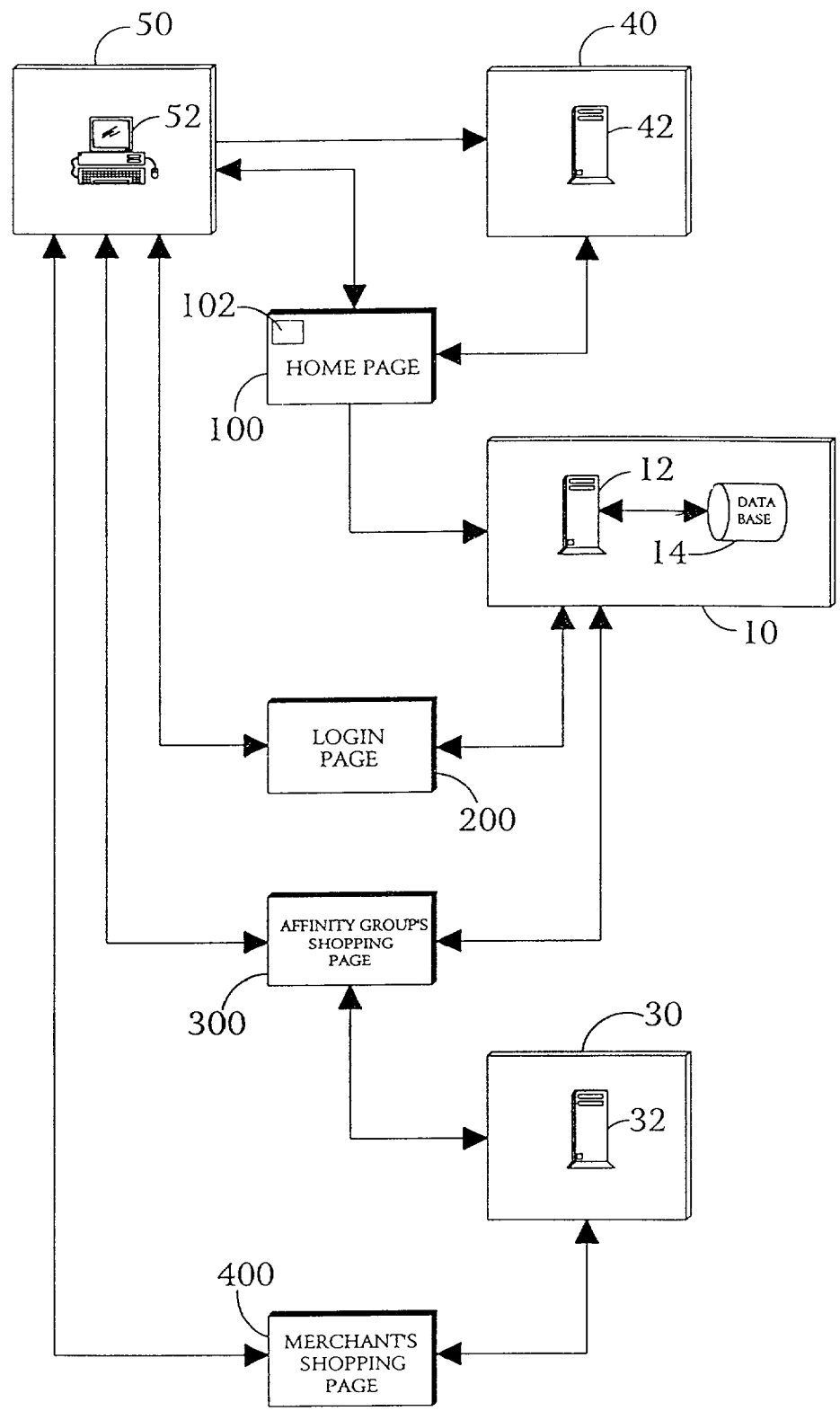
FIG. 2 is a diagrammatic illustration showing a shopping experience using an Internet portal in accordance with aspects of the present invention.

With further reference to FIG. 2, the consumer 50 accesses the affinity group 40 over the Internet 20 at the latter's web-site which is administer via the affinity group's server 42. Alternately, the coordinator 10 administers the affinity group's web-site for them via the coordinator's server 12. In any event, the affinity group's home page 100 or other designated web-page is called up by the consumer 50 or it is otherwise provided thereto by the affinity group 40. Preferably, the home page 100 includes a hyper-link 102 thereon that directs the consumer 50 to the coordinator 10. When the consumer 50 visiting the affinity group's web-site wishes to shop, he or she "clicks-on" or otherwise activates the hyper-link 102. Preferably, the hyper-link 102 references its purpose by appearing on the home page 100 as, e.g., the phase "SHOPPING LINKS" or other such suggestive phases and/or indicia.

As stated, upon activation of the hyper-link 102, the consumer 50 is directed to the coordinator 10. Optionally, the consumer 50 may choose to access the coordinator 10 directly. Initially, the coordinator 10 provides a "login" page 200 to the consumer 50. Via the login page 200, if the consumer 50 has already signed up or registered with the coordinator 10, he may log in and/or identify himself by entering a user name and password or other identifying information. The entered identifying information is preferably verified against the records maintained in the database 14. Otherwise, if the consumer 50 has not previously signed up or registered with the coordinator, he may do so via the login page 200 such that a new record is created for him in the database 14. The consumer 50 signs up with the coordinator 10 by supplying the coordinator 10 with the information used to create the new record. Preferably, the record includes one or more of the following: the consumer's name, the consumer's identifying information (e.g., user name, password, etc.), the consumer's electronic mail (e-mail) address, the consumer's home and/or work addresses, the consumer's home and/or work phone numbers, the consumer's social security number, and other like personal information.

Figure 3:
FIG. 3 is a screen shot of an exemplary affinity group shopping site or web-page in accordance with aspects of the present invention.

After logging in, the affinity group's shopping site or web-page 300 is called up by the consumer 50 or it is otherwise provided thereto by the coordinator 10 which preferably maintains and/or administers the same on the affinity group's behalf. See FIG. 3 for an exemplary screen shot of an affinity group shopping site or web-page 300. In a preferred embodiment, the coordinator 10 similarly maintains and/or administers a plurality of shopping sites or web pages for a corresponding plurality of affinity groups 40. With respect to a consumer 50 which arrived by way of a particular affinity group's home page 100, the consumer 50 is automatically direct to that same affinity group's shopping site or web-page 300. Alternately, the consumer 50 may select the shopping site or web-page 300 he wishes to visit or access. In particular, the consumer selection route is used when the consumer 50 did not arrive via a particular affinity group's home page 100, e.g., where the coordinator 10 was accessed directly. The consumer 50 may also directly access the affinity group's shopping site or web-page 300 which may optionally include the log in function and/or the sign up or registration function. In the case where the affinity group's shopping site or web-page 300 includes the log in function and/or the sign up or registration function, the consumer 50 activating hyper-link 102 may optionally be directly routed thereto without first stopping at the login page 200.

In any event, once logged in and identified, the consumer's activities are monitored so that ultimately click-through fees generated by the consumer's activities can be tracked and associated with the consumer 50 and the affinity group 40 through which the consumer 50 is shopping.

Preferably, each shopping site or web-page 300 is individually styled and/or designed for its associated affinity group, and each contains one or more hyper-links which direct the consumer 50 activating a selected hyper-link to a corresponding contracting merchant 30. The hyper-links on the affinity group's shopping site or web-page 300 are preferably organized so that they may be easily located by a consumer 50 accessing the same. For example, they may be organized alphabetically under the merchants' names, or by categories of goods and/or services offer by the merchants, or some combination thereof, etc. Optionally, the style or manner of organization may be selected by the consumer 50 from a plurality of defined organizational schemes. Additionally, a search engine is optionally provided to locate particular contracting merchants 30 and/or text of interest.

In a preferred embodiment, the contracting merchants 30 are registered with the coordinator 10 and have negotiated with the coordinator 10 or individual affinity groups 40 to have hyper-links to their online web-sites included in selected ones or in all the affinity group shopping sites or web-pages 300 maintained and/or administered by the coordinator 10. In return, the contracting merchants 30 have agreed to pay click-through fees for directing consumers 50 to them. The click-through fees are optionally calculated as a flat fee for each referral, a flat fee for each referral which makes a purchase, a percentage of each referral's purchases, or an otherwise determined amount. Records regarding registered merchants 30 are preferably maintained in the coordinator's database 14. The merchant records preferably include one or more of the following pieces of information: identification information (e.g., type of merchant, type of goods and/or services sold, a designated user name or ID, physical address, e-mail address, web address or Universal Resource Locator (URL) address, merchant's name, corporate name and/or tax ID, etc.); security information, such a secret password; click-through fee information, such as the negotiated or agreed upon click-through fee rate or amount; financial account information, such as financial account numbers from which click-through fees are to be paid; etc.

The affinity groups 40 are also registered with the coordinator 10 and have negotiated with the coordinator 10 to have their online shopping sites or web-pages 300 maintained and/or administered by the coordinator 10. In return, the affinity groups 40 have agreed to share derived or generated click-through fees with the coordinator 10. Records regarding registered affinity groups 40 are preferably maintained in the coordinator's database 14. The affinity group records preferably include one or more of the following pieces of information: identification information (e.g., type of affinity group, a designated user name or ID, physical address, e-mail address, web address or URL address, affinity group name, corporate name and/or tax ID, etc.); security information, such as a secret password; share information, such as the negotiate or agreed upon share of the click-through fee to be had by the affinity group 40 and the coordinator 10; financial account information, such as financial account numbers to which the affinity group's share of click-through fees are to be posted; etc.

When a consumer 50 activates one of the hyper-links on an affinity group's shopping site or web-page 300, they are directed to the corresponding merchant 30 where they may call up or are otherwise provided access to the merchant's shopping site or web-page 400. Thereafter, in the usual manner, the consumer 50 is free to shop online from the merchant's shopping site or web-page 400. The consumer's shopping activities are monitored and records thereof are maintained in the coordinator's database 14. The shopping activity records are preferably correlated with the records of identified registered consumers 50 already in the database. The shopping activity records preferably include one or more of the following pieces of information: identification information regarding the consumer 50; identification information regarding the merchant 30 where the shopping took place; identification information regarding the affinity group 40 or the affinity group's shopping site or web-page 300 through which the consumer 50 arrived at the merchant's shopping site or web-page 400; sales information regarding the purchases made (e.g., item(s) purchased, quantity, purchase price, etc.); the time and/or date of the purchases made; etc.

Figure 4:
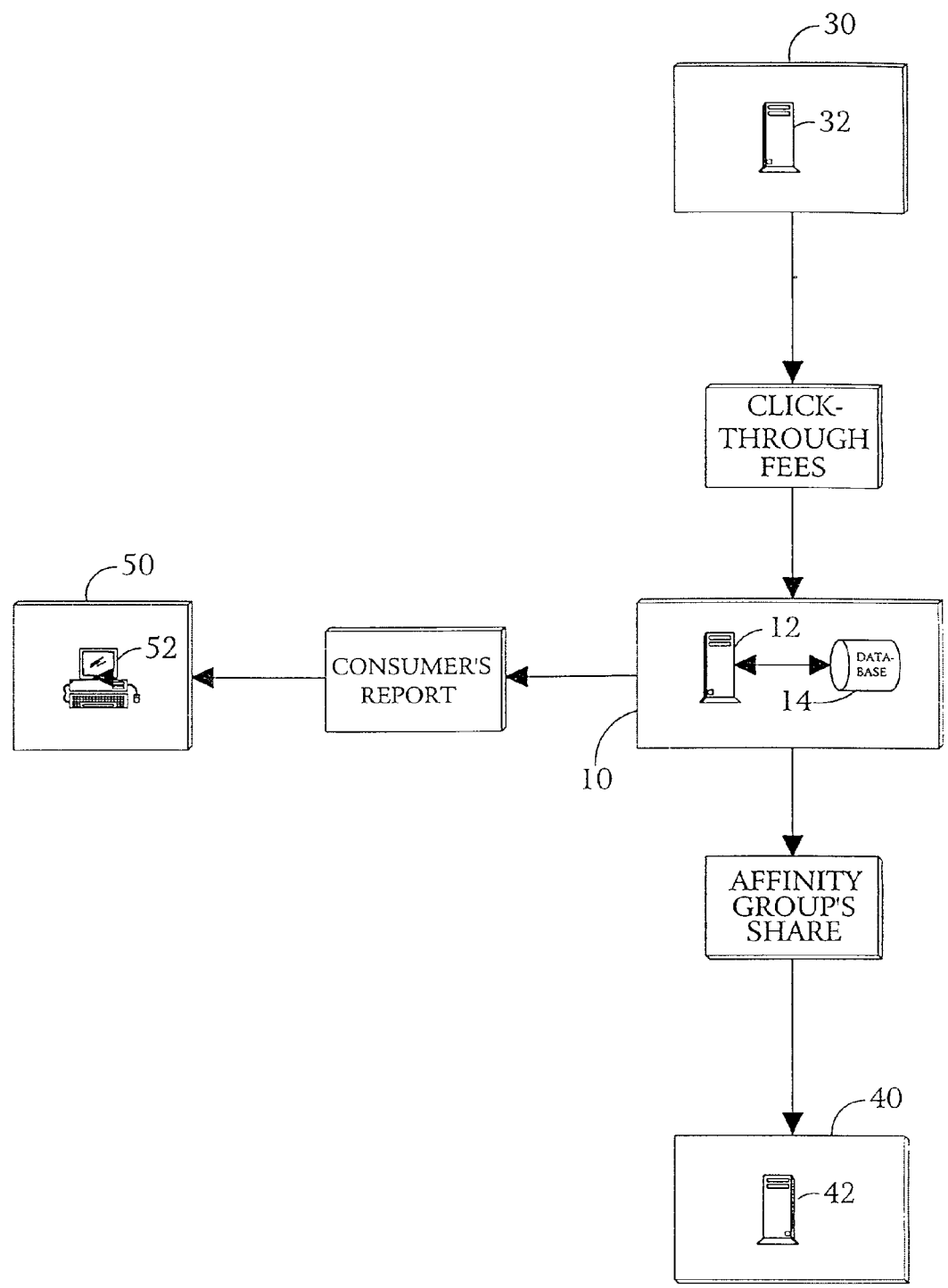
FIG. 4 is a diagrammatic illustration showing a periodic settlement and reporting process carried out in accordance with aspects of the present invention.

With further reference to FIG. 4, the coordinator 10 periodically collects or otherwise receives payment for the click-through fees from the contracting merchants 30 in accordance with the agreed upon terms. This may be done in a variety of manners as are known in the art, e.g., via electronic funds transfer, traditional settlement techniques, etc. Payments for the click-through fees may be verified against and/or correlated with shopping records maintained in the coordinator's database 14.

The coordinator 10 preferably retains a percentage, a flat fee or rate, or an otherwise determined share of the click-through fees as payment to cover the overhead and/or services rendered by the coordinator 10. What remains of the click-through fees is distributed to the affinity groups 40 in accordance with terms agreed upon between the coordinator 10 and the affinity groups 40. Preferably, each affinity group 40 receives an agreed upon amount (flat fee, percentage, or otherwise) for each click-through fee resulting from a consumer referral associated with their particular affinity group shopping site or web-page 300. Having been correlated with their respective records in the database 14, each amount distributed to the affinity groups 40 can be, and are preferably, designated as being from the specific consumer 50 responsible for generating the affinity group's share of each click-through fee. Accordingly, the affinity groups 40 can recognize each supporter's contribution as they see fit, e.g., via a letter of thanks to the supporter, an annual award for achieving a threshold level of support, etc.

A consumer 50 that is not registered with the coordinator 10 may still be referred to a contracting merchant 30 through one of the affinity group shopping sites or web-pages 300. In this case, click-through fees may still be generated. Such click-through fees that result in a distribution to one of the affinity groups 40 is optionally designated as being from "anonymous."

In a preferred embodiment, periodically (preferably monthly, quarterly, or yearly), the coordinator 10 complies information from the database 14 into reports which are forwarded to each registered consumer 50. The reports are optionally forwarded to their respective consumers 50 via e-mail, regular U.S. mail, or otherwise. The reports give a detailed summary of each consumer's shopping activities for the given period and communicate the amount of financial support or donations that were generated by each consumer 50 for respective affinity groups 40 due to their shopping activities. That is to say, each report communicates to its respective consumer 50 the amount or share of click-through fees received by each of the affinity groups 40 that are attributable to that consumer 50 for the given period.

In this manner then, the coordinator 10 acts as a shopping portal for the mutual benefit of merchants 30, affinity groups 40, and consumers 50. That is to say, merchants 30 attract Internet traffic to their online shopping sites or web-pages 400, while affinity groups 40 receive financial support through the sharing of the click-through fees. Consumers 50 also receive the benefits of supporting their selected affinity groups 40 with their support being tracked and reported back to them and the affinity groups 40 so that appropriate recognition may be received, consumers 50 may reflect on and/or take pride in their support, tax benefits may be realized if available, or other desired actions may be taken based thereon. Moreover, transaction volume is maximized insomuch as the consumer 50 is encouraged to participate. That is to say, the consumer 50 is only doing that which he or she would be already doing otherwise, i.e., shopping online.

In addition, by having the coordinator 10 maintain and/or administer the affinity groups' shopping sites or web-pages 300, the affinity groups are free to devote more of their efforts, network and/or computer resources, online resources, webpage space, etc. toward their core objectives, be it charity work or otherwise. The coordinator 10 is also able to pool the bargaining power of multiple affinity groups 40 (with an arguably larger consumer base than individually) when negotiating terms with merchants 30. In turn, the merchants 30 benefit from the larger consumer base shopping through the portal.

Another aspect of the present invention is that it allows the affinity group 40 to design and build their own shopping portal with little to no technical expertise. This is achieved by a representative of the affinity group 40 connecting to the coordinator's web site and utilizing an application that allows for the instant creation of a customized shopping portal. Through a series of questions and answers or otherwise, the desired data is collected and used to dynamically create a program that provides for the customized shopping portal. In a preferred embodiment, the application optionally allows the affinity group 40 to build additional services into their web site, such as, a calender, news items, etc. This helps to further build community strength and support of the affinity group 40.

Figure 5:
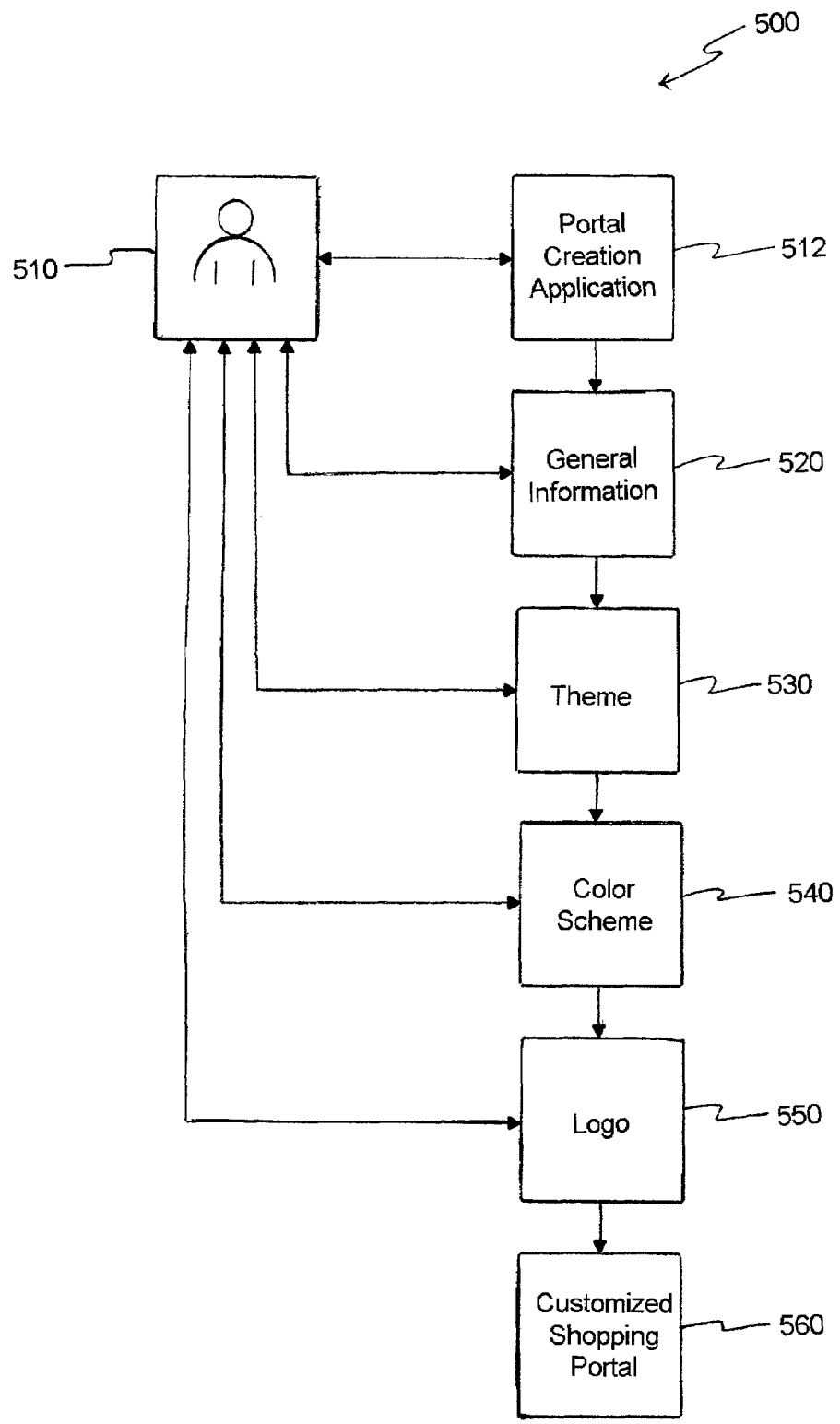
FIG. 5 is a diagrammatic illustration showing a customized shopping portal creation protocol in accordance with aspects of the present invention.

With reference to FIG. 5, a customized shopping portal creation protocol 500 is shown. An affinity group 40 or a representative 510 thereof (as shown) contacts the coordinator 10 over the Internet 20 and accesses a portal creation application 512 supported on the coordinator's server 12. Preferably, the representative 510 logs in to application 512 by entering a username and password or other like authentication data. Via a series of prompts and/or web pages provided to the representative 510, the application 512 collects data used to create a customized shopping portal for the affinity group 40. In a preferred embodiment as shown, a first series of prompts or web page 520 is used to collect general information about the affinity group, e.g., name, contact information, etc. A second series of prompts or web-page 530 is used to collect a chosen theme template that will dictate the physical layout of the portal. Optionally, the representative 510 will chose from a number of defined templates or will be able to selectively arrange the order and/or size of a number of different regions which will contain the particular content of the representative's choosing. The theme may also be used to define the fonts and other like characteristics of the created portal. A third series of prompts or web page 540 is used to collect a chosen color scheme that will dictate the colors used in the layout of the portal. Optionally, the representative 510 will choose from a number of defined color pallets or will be able to selectively choose specific colors for designated regions. A final series of prompts of web page 550 allows the representative 510 to optionally upload any logos, trademarks, etc. that he desires to have included in the customized shopping portal.

Once all the information has been collected, the application 512 generates the customized portal 560. The portal 560 is essential a web site, and it may optionally reside on the affinity group's own server 42 or the coordinator's server 12. Similarly, the web site 300 may be supported on either server. In any event, the portal 560 is assigned a unique identification number or other like data element so that the coordinator 10 may track purchases made by consumers 50 linking to merchants 30 through the portal 560. In this manner, a designated portion of the collected click-through fee may be associated with the affinity group 40 on whose behalf the portal 560 was created and maintained.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment(s) the invention is now claimed to be:

1. A shopping portal comprising:
    means for maintaining a presence on a communications network such that shoppers employing the communications network can be received;
    means for identifying received shoppers;
    means for forwarding shoppers to selected shopping sites maintained on the communications network;
    means for monitoring forwarded shoppers activities at the shopping sites to which the shoppers are forwarded;
    means for obtaining click through fees based upon the monitored activities of shoppers at the shopping sites to which the shoppers were forwarded;
    means for distributing a portion of each obtained click through fee to an affinity group associated with the shopper responsible for generating the click through fee;
    means for reporting to shoppers an amount distributed to the shoppers' associated affinity groups by the distributing means; and
    customizing means for a representative of an affinity group to create a customized web site for the affinity group.

2. The shopping portal according to claim 1, further comprising:
    means for communicating to the affinity groups the identity of the shopper responsible for each distribution made by the distributing means.

3. The shopping portal according to claim 2, wherein if the identifying means does not identify a received shopper that is responsible for a distribution being made by the distributing means, then the communicating means indicates that the distribution is made anonymously.

4. The shopping portal according to claim 3, wherein the forwarding means permits shoppers to choose which shopping site they are forwarded to from a plurality of different shopping sites.

5. The shopping portal according to claim 4, wherein the portion distributed by the distributing means is based upon an amount of purchases observed by the monitoring means.

6. The shopping portal according to claim 5, wherein the communications network is the Internet.

7. The shopping portal of claim 1, wherein the customizing means includes a creation application accessible by the representative over the communications network.

8. The shopping portal of claim 7, wherein the creation application collects data used to dynamically create a program that provides the customized web site.

9. The shopping portal of claim 8, wherein the data is collected via a series of prompts or web pages provided to the representative.

10. The shopping portal of claim 8, wherein the collected data includes information about the affinity group for which the customized web site is being created.

11. The shopping portal of claim 8, wherein the collected data includes a selection of a template that dictates the physical layout of the customized web site.

12. The shopping portal of claim 11, wherein the collected data includes a selection of one or more colors to be used at particular locations in the layout of the customized web site.

* * * * *